Patented Oct. 21, 1941

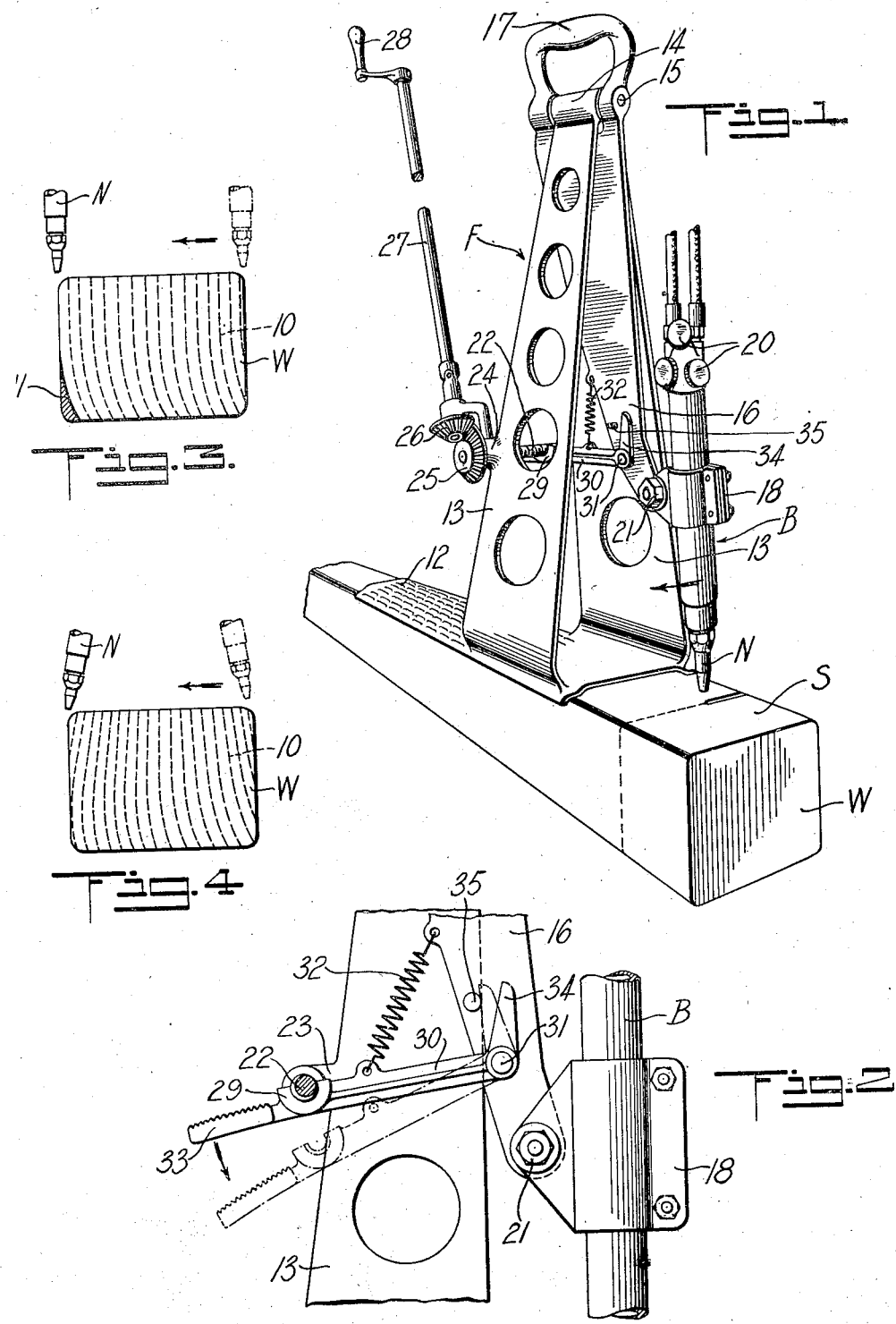

2,259,955

UNITED STATES PATENT OFFICE 2,259,955

METHOD OF AND APPARATUS FOR SEVERING METAL STOCK

Homer W. Jones, Westfield, N. J., assignor to Oxweld Acetylene Company, a corporation of West Virginia Application January 6, 1940, Serial No. 312,677

7 Claims. (Cl. 266—23)

This invention relates to a method of and apparatus for thermo-chemically cutting metal bodies and more particularly to a method of and apparatus for quickly severing elongated ferrous metal bar stock with a cutting blowpipe.

Steel billets and bars are customarily cut into predetermined lengths in steel mills by heavy shears or by large metal saws while they are hot. Such cutting is done generally while they are still on the conveyor line. It is customary in steel mill practice to place the billets on cooling beds or spread out on a chipping floor for inspection and for the removal of defects. After such inspection it is often desired to cut off defective end portions or to cut the billets to a desired length. This is often the case when billets have been stored in a general stock and are taken from such stock to be cut into lengths desired for completing a special order. When such billets are mechanically sawed much time is consumed and heavy handling machinery is required for placing the billets in the saw, cutting them and moving them.

According to the present invention, there is provided a portable device for quickly severing such billets where they lie by a mechanically moved cutting blow pipe. The device is readily portable so that it can be quickly transferred from one billet to the next while the billets are, for example, laid out on the chipping floor. The method of cutting rectangular billets, according to the invention, provides a movement of the blowpipe completely across the stock in a plane transverse to the stock such that the inclination of the cutting jet is forward at the beginning of the kerf and backward at the end portion of the kerf. Such motion provides a relatively more rapid completion of the kerf so that the billet is completely severed and no uncut corner will remain. Such initial positioning of the blowpipe also permits quicker starting of the kerf. The desired arcuate motion of the blowpipe is provided, for example, by mounting the blowpipe at the lower end of an arm that swings like a pendulum about a pivot or axis located a substantial distance directly above the stock.

The invention has for its principal objects to provide a method of and apparatus for rapidly and completely severing elongated bar stock such as rectangular billets; for insuring complete severence of the stock by a single pass of a blowpipe across the stock; for permitting relatively more rapid initiation of the kerf; and to provide a portable device that is quickly movable from one billet to another and quickly adjustable for starting a cut.

The manner in which these and still other objects are attained by the invention will be apparent from the following description and the accompanying drawing, in which:

Fig. 1 is a perspective view of an exemplary form of the apparatus according to the invention;

Fig. 2 is a fragmentary elevational view partly in section on an enlarged scale showing details of the blowpipe moving mechanism; and Figs. 3 and 4 are schematic diagrams illustrating respectively, the effect of maintaining the blowpipe axis vertical during the cutting, and of moving the blowpipe axis through an arc during the cut.

In severing metal bodies by a cutting blowpipe it has been customary to maintain the axis of the blowpipe normal to the surface against which the gas is projected during a cut. Such positioning of the blowpipe involves no difficulties if the rate of traverse movement is maintained at customary speeds recommended for cutting the particular thickness of metal being cut. When, however, the cutting speed is increased, the lower portion of the cutting jet tends to lag behind the upper portion of the jet so that the lag lines illustrated at 10 in Fig. 3 are produced. Such lag is particularly disadvantageous when the jet reaches the opposite edge of the surface impinged because when the jet reaches the opposite edge it is suddenly deflected into the atmosphere leaving a lower corner portion 11 of the billet uncut. Such difficulties are avoided, according to the invention, by inclining the cutting jet at a varying angle as it traverses the work surface, the inclination being forward at the beginning of the kerf so that the heating flames impinge merely on the corner of the stock whereby such corner is very rapidly heated to the ignition temperature. As the jet moves across the stock the inclination is gradually and smoothly changed from a forward inclination to a rearward inclination at the finishing end of the kerf. This change of inclination, as illustrated in Fig. 4, is sufficient to compensate for or counteract the effect of the accumulating cutting lag so that the billet is completely severed without leaving any uncut corner portion. It will be seen that the angular inclination at the beginning and at the end may be different and each inclination arranged to be of a degree particularly suited respectively for starting the kerf and for completely severing the body after a relatively rapid transverse movement of the jet.

According to this invention there is provided a relatively simple device for obtaining the desired angular motion during the transverse motion of the blowpipe. By swinging the blowpipe through an arc about an axis or fixed point which is directly above the surface of the work in a plane with the vertical center line of the stock, the angle at the beginning and end of the kerf will be of the same value but in the reverse direction. If the axis or point about which the blowpipe is swung is to the right of such vertical center line, the angle of the blowpipe at the right-hand edge of the stock will be less than the angle at the left-hand edge, which arrangement may be desirable since it is ordinarily not necessary for the angular relation to be as great for quick starting as for overcoming a relatively large lag at the finish of a cut. The axis about which the blowpipe swings should be located a sufficient distance from the billet surface so that excessive vertical movement of the tip of the blowpipe toward and from the surface of the stock during the swing is avoided. However, the distance between the axis about which the blowpipe swings and the surface of the stock must be small enough and must be selected with respect to the width of the stock being cut so that the desired angles between the blowpipe axis and the surface are obtained at the beginning and end of the cut. Such distance will always be substantially greater than the width of the stock.

Referring now to Figs. 1 and 2, the portable device for severing billets according to the method of this invention, comprises a triangular normally vertical frame F having a base 12 which is adapted to be mounted on the top surface S of the work W. The base 12 extends rearwardly a sufficient distance to provide a tread surface on which the operator may stand thus holding the frame F securely down on the surface S. The frame F has two side members 13 joined at their lower ends to the base 12 at laterally spaced-apart points. The side members 13 are joined together at their upper ends to form a bearing 14 in which is journaled a shaft 15. The shaft 15 is preferably parallel to the longitudinal axis of the work W and constitutes a normally horizontal pivot located at a sufficient distance above the surface S so that there will be the desired angular relation between the surface S and imaginary lines between the pivot of shaft 15 and both edges of the surface S. The shaft 15 extends through either end of the bearing 14 a short distance into the forked ends of an elongated arm 16 which depends downwardly between the side members 13. The forked members of the arm 16 may be joined by a handle 17.

A blowpipe B is secured by a holder 18 at the lower end of the arm 16. The blowpipe B has a substantially tubular body portion at the lower end of which is mounted a cutting nozzle N and at the upper end are hose connections for supplying cutting oxygen and heating gas and control valves 20 for adjusting the flow of the gases. The holder 18 has a clamp portion surrounding the body of the blowpipe B in such a manner that the blowpipe can be adjusted vertically with respect to the holder 18. The holder 18 also is provided with an ear portion that is adjustably secured to the end of the arm 16 by a bolt 21.

Means for moving the arm 16 and the blowpipe thereon transversely is provided. Such means may be automatic such as a suitable mechanism driven by an electric motor. But if a power supply is not conveniently available, the moving means may preferably be manually operated, as shown. Such moving means comprising a horizontal screw 22 that is journaled at each of its ends in bearings 23 and 24 that are mounted at the rear edges of the members 13. The end of the screw 22 extends outside of the bearing 24 a short distance to carry a bevel gear 25 which meshes with a corresponding bevel gear 26 at the lower end of a crank shaft 27 carrying at its upper end a crank handle 28. A half-nut 29 meshes with the screw 22 and is carried by a lever 30 the forward end of which is pivoted at 31 to the arm 16. The lever 30 is urged upwardly by a tension spring 32 which has its ends secured to the lever 30 and to the arm 16. The outer end of the lever 30 beyond the half-nut 29 is provided with a foot treadle 33 by which the operator may disengage the half-nut 29 from the screw 22, at will. To prevent excessive movement of the lever 30, it is also provided with an upward extension 34 which is arranged to engage with a stop pin 35 on the arm 16.

In operation the machine is placed in position on top of a billet W and the operator stands upon the base 12. The operator places his foot upon the treadle 33 to disengage the half-nut 29 from the screw 22 (as shown by the broken lines) so that the arm may be freely and rapidly swung to the right in order to position the nozzle N at the edge of the surface S for beginning the cut. The preheating gases are turned on and ignited to raise a portion of the corner of the billet to a kindling temperature. The cutting oxygen is then turned on and the crank handle 28 rotated to swing the blowpipe B across the billet W in an arc about the axis 15, the arc having a radius which is greater than its chord at the surface S and the movement being at a relatively rapid rate. When the cut is complete, the gases are shut-off and the treadle 33 is depressed to swing the arm 16 back to the starting position for starting another cut after the device is moved to another position on the same billet or on a different billet. If the billet to be cut is still at a relatively high temperature, it will be preferable to add a heat insulating covering over the base 12 and to provide other heat shields to protect the operator.

What is claimed is:

1. Apparatus for thermo-chemically cutting rectangular metal bar stock which comprises a blowpipe for applying oxidizing gas against a flat surface of said stock for making a kerf therethrough; a frame having a pivot supporting portion positioned at a distance above said surface substantially greater than the width of said surface; an arm pivotally connected to said pivot supporting portion of said frame; a holder on said arm for holding said blowpipe in a cutting position; and mechanism for swinging said arm and said blowpipe thereon about said pivotal connection to traverse said blowpipe across said flat surface of said stock at a relatively rapid cutting speed, said cutting speed being correlated to the length of said arm and the position of said pivot to insure complete severance of said stock.

2. Apparatus for thermo-chemically cutting metal stock according to claim 1 in which said swinging mechanism includes a feed screw rotatably mounted on said frame, means for manually rotating said screw, a half-nut engageable with said feed screw and pivotally mounted on said arm, and means for disengaging said half-nut from said screw to permit rapid movement of said blowpipe to the starting position.

3. Apparatus for thermo-chemically cutting rectangular metal bar stock which comprises a blowpipe for applying oxidizing gas against a surface of said stock for making a kerf therethrough; a frame having a lower portion adapted to be mounted on said surface and a portion supporting a fixed axis; and mechanism connecting said blowpipe to said frame for moving said blowpipe transversely across said stock, such mechanism including means for swinging said blowpipe about said fixed axis on said frame, said axis being located a substantial distance directly away from said surface of the stock.

4. Apparatus for thermo-chemically cutting rectangular metal bar stock which comprises a blowpipe for applying oxidizing gas against a surface of said stock for making a kerf therethrough; a frame having a lower portion adapted to be mounted on said surface, said frame having side members spaced apart at their lower ends and joined at their upper ends; an arm pivotally connected to said frame at said upper ends and depending downwardly between said members; means adjacent the lower end of said arm for holding said blowpipe; and means for swinging said arm and said blowpipe thereon between said members to traverse the blowpipe across the stock at cutting speed.

5. A method of thermo-chemically severing relatively thick rectangular bar stock by a jet of oxidizing gas moved transversely across a surface of said stock, the portions of said surface against which said jet is applied being at an ignition temperature, such method including the steps of sweeping said jet through an arc about a fixed point in a transverse plane completely across said surface at a smoothly controlled rate, said arc having a radius which is greater than its chord at said surface, said rate being sufficient to produce a substantial cutting lag, and during the latter portion of said movement, gradually and smoothly changing the angle of inclination between the axis of said jet and said surface to provide a backward inclination of a predetermined degree when said jet reaches the finishing end of the cut, the rate of transverse movement being correlated with said predetermined degree of inclination to compensate for said cutting lag and effect completely severance of said stock.

6. Apparatus for thermo-chemically cutting rectangular metal bar stock supported in a position to be cut, which apparatus comprises a blowpipe for applying an oxidizing gas stream against a flat surface of said stock for making a kerf transversely therethrough; a frame having a fixed bearing portion, said frame being positioned with respect to said stock to support said fixed bearing portion directly above said surface of the stock at a distance substantially greater than the width of said surface; and mechanism carrying said blowpipe on said frame for moving said blowpipe transversely across said surface of said stock at a cutting speed, such mechanism including an arm of substantial length for swinging said blowpipe about the axis of said fixed bearing portion of said frame.

7. Apparatus for thermo-chemically cutting rectangular metal bar stock supported in a position to be cut, which apparatus comprises a blowpipe having a nozzle for applying an oxidizing gas stream against a flat surface of said stock for making a kerf transversely therethrough; a vertical supporting frame positioned with respect to said stock for carrying said blowpipe in such stream applying relation with respect to said surface; and mechanism carrying said blowpipe on said frame for traversing said blowpipe nozzle in an arc transversely across said surface of said stock at cutting speed, such mechanism including a blowpipe holder, and an elongated arm connected to said holder and pivotally connected on a horizontal pivot to said frame above said stock, the radius of said arc being greater than the width of said stock for smoothly varying the angular relation between the axis of said blowpipe nozzle and said surface in the plane of said kerf so that at the starting end of the kerf said nozzle axis is forwardly inclined a relatively small amount sufficient to insure a rapid starting of the kerf and as the nozzle reaches the finishing portion of the kerf said axis is inclined backwardly a predetermined amount correlated with said cutting speed sufficient to compensate for the cutting lag resulting from such cutting speed and effect complete severence of said stock in a single uninterrupted traverse.

HOMER W. JONES.